United States Patent [19]
Cooper

[11] 3,782,272
[45] Jan. 1, 1974

[54] FOOD HANDLING EQUIPMENT AND METHOD OF USE
[75] Inventor: Ernest A. Cooper, Poway, Calif.
[73] Assignee: Toolmakers, Inc., San Diego, Calif.
[22] Filed: May 19, 1971
[21] Appl. No.: 144,742

[52] U.S. Cl............... 99/450.7, 99/450.6, 141/158, 141/168, 222/217
[51] Int. Cl.......................... A21c 9/06, A21c 11/00
[58] Field of Search....................... 99/450.2, 450.6, 99/450.7, 450.8, 443 C, 450.1; 53/59, 60, 194, 195; 141/158, 168; 222/217

[56] References Cited
UNITED STATES PATENTS

| 3,245,360 | 4/1966 | Evanson et al. | 99/450.2 |
| 3,667,971 | 6/1972 | Brunner | 99/450.7 X |
| 3,420,282 | 1/1969 | Marlow et al. | 141/157 |
| 2,550,903 | 5/1951 | Berch | 222/217 |
| 2,498,100 | 2/1950 | Tyrrell | 222/217 X |
| 2,905,105 | 9/1959 | Lombi | 99/450.6 |
| 2,663,477 | 12/1953 | Bendz | 141/157 |

Primary Examiner—Harvey C. Hornsby
Assistant Examiner—Alan I. Cantor
Attorney—R. W. Brukardt and L. J. Hurst

[57] ABSTRACT

The method and apparatus for continuously and automatically metering or dispensing a material to be utilized in the preparation of a food product is disclosed. More particularly this relates to a method and apparatus for automatically handling food products which may be effectively utilized in automatically producing a taco food product. The method consists of conveying tortillas past a metering position wherein a predetermined quantity of meat material is deposited on the tortilla, and thereafter the tortilla is conveyed between a pair of opposed rollers for folding and enclosing the tortilla about the meat filler to form the taco food product.

The apparatus which may be utilized for effecting the metering or dispensing of materials in this manner consists of a valve member having a metering chamber therein, the valve member being movable between a supply position and a discharge position. The movement of the valve and the discharge of the material from the metering chamber is effected in response to an applied force or a signal indicating the presence of a receiving member beneath the metering valve.

2 Claims, 3 Drawing Figures

PATENTED JAN 1 1974  3,782,272

INVENTOR
ERNEST A. COOPER
BY
Lawrence J. Hurst
ATTORNEY

FOOD HANDLING EQUIPMENT AND METHOD OF USE

BACKGROUND OF THE INVENTION

The method of making tacos heretofore has primarily been by the use of a large amount of hand labor. This was necessitated because of the previous small demand for such type products. However, now that there has been a wide acceptance of taco products it is important that means be developed for automatically and continuously manufacturing such products with minimum operator attention.

One of the principal objects of the subject invention is directed to the method of preparing tacos without operator intervention and provides apparatus suitable for continually carrying out such a method. Additionally, the apparatus is of simplified construction so that it may be easily cleaned and serviced.

Another of the objects of the present invention is to provide an automatic dispensing means which may be utilized for continuously metering a given quantity of material automatically in response to a demand signal.

Another object of the present invention is to provide a dispensing valve which permits the modification or altering of the quantity of material to be dispensed from the valve in a simplified manner.

Briefly, one aspect of the present invention comprises the method of automatically forming a taco by sequentially conveying tortillas along a predetermined path, metering a predetermined quantity of filling material on to the tortilla in response to a signal that the tortilla is in the metering position, and conveying the tortilla between opposed rollers to effect the folding and enclosing of the tortilla about the meat filler.

Another aspect of the present invention is to provide food handling or dispensing means having a valve rotatable within a housing and defining at least two metering chambers therein; said valve being effective to move said metering chambers from a supply position to a discharge position in response to a signal and discharge means connected to said valve for discharging the material from said metering chamber in response to said signal.

BRIEF DESCRIPTION OF DRAWINGS

Corresponding reference characters indicate corresponding parts throughout the several views of the drawings.

DESCRIPTION OF THE PREFERRED EMBODIMENT

Figure 2:
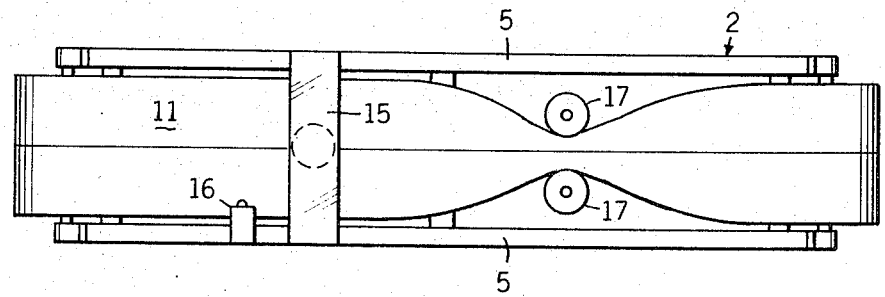
FIG. 2 is a top view of the machine of FIG. 1.
Figure 1:
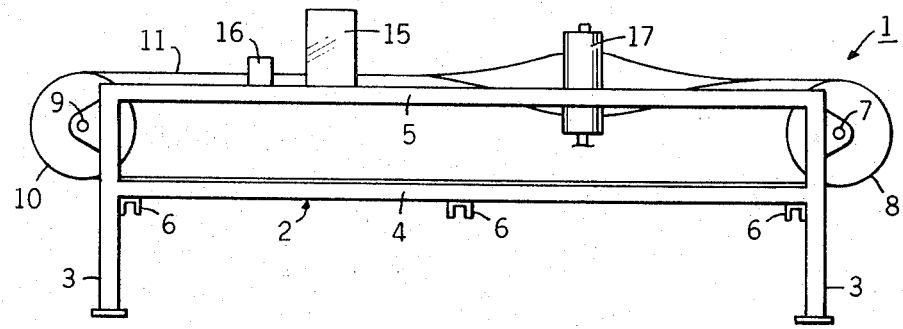
FIG. 1 is a side view of a machine embodying the present invention.

Referring now to FIG. 1, a machine for automatically forming a taco, indicated generally at 1, is provided with a frame 2 having corner posts 3 which are connected by longitudinally extending members 4 and 5 and by cross braces 6. A shaft 7 is provided on the rightward end of the frame 2 by suitable means, such as brackets, and has mounted thereon a drive wheel or drum 8. The drive wheel 8 is connected to suitable means such as a motor (not shown) for effecting the rotational movement of the drive wheel 8. The leftward end of the machine 1 is provided with a shaft 9 connected to the legs 3 by suitable means, such as brackets, and the shaft 9 has mounted thereon an idler wheel or drum 10. A flexible continuous belt 11 is provided for passage about the drums 8 and 10 and is driven thereby. The flexible belt 11 should be of a material which may be folded during its path of travel or may be of a construction having two adjacent belts, such that the two belts may be brought into juxtaposition, as will be more fully disclosed hereafter.

A food handling or dispensing member 15 is connected to the frame by suitable bracing and is positioned adjacent to the leftward or inlet end of the machine 1. The food handling member 15 should be spaced a predetermined distance above the upper face of the belt 11. A photo cell 16 is provided on the frame 2 slightly advanced from the metering or dispensing valve 15 for detecting the presence of a tortilla on the conveyor 11. In addition, a pair of opposed rollers 17 are provided adjacent the outlet or discharge end of the machine by suitable mounting such as a brace 18 between the longitudinally extending braces 4. The rollers 17 are provided for rotation about a vertical axis and are driven by suitable means such as a motor, not shown. The rollers 17 should be constructed of a material which permits the belt 11 to pass therebetween without being damaged. If desired, the rollers 17 may be spring biased towards each other so as to establish a predetermined amount of pressure on the belt 11 and the material passed therebetween.

Figure 3:
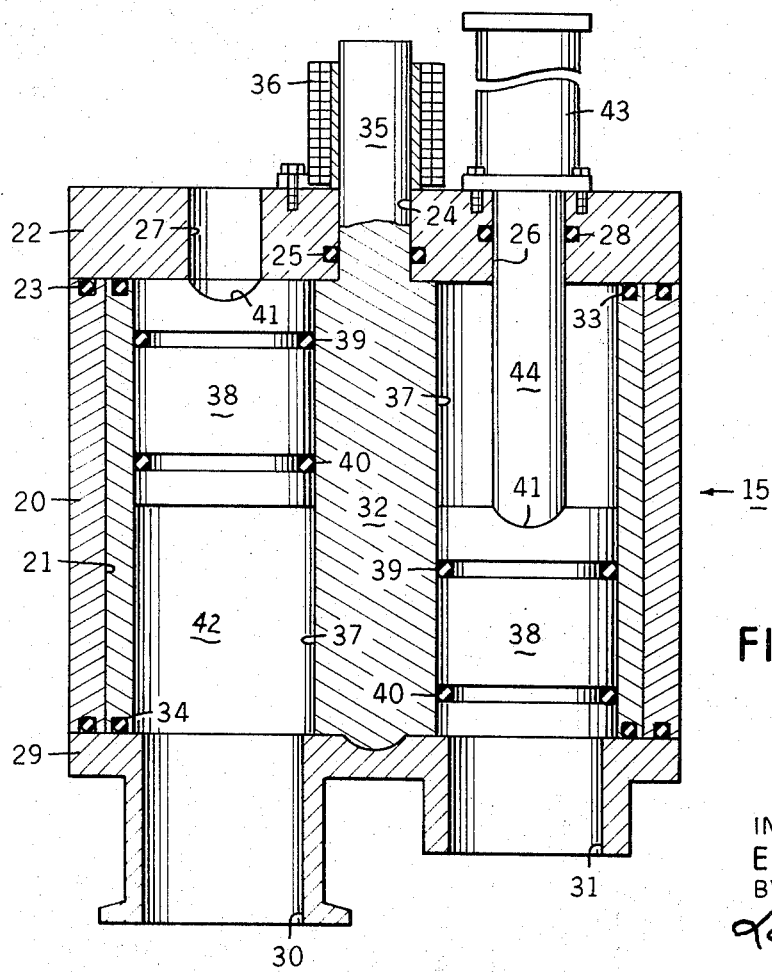
FIG. 3 is a cross sectional view of the metering valve and discharge mechanism utilized on the machine of FIG. 1.

Referring now to FIG. 3, the food handling device or dispensing valve 15 consists of a housing 20 having a bore 21 therethrough. One end of the housing 20 is provided with a retainer plate 22 secured to the housing by suitable means such as bolts not shown and in sealing engagement therewith by means of an O-ring 23. The retainer plate 22 is provided with a centrally located opening 24 having an O-ring 25 about the inner periphery thereof. A pair of openings 26 and 27 are also provided in the retainer plate 22 spaced from the opening 24. An O-ring 28 is provided about the inner periphery of the opening 26. The other end of the housing 20 is provided with a plate 29 secured to the housing by suitable means, such as bolts, not shown, and in sealing engagement therewith. The plate 29 is provided with an inlet opening 30 which connects with the bore 21 and which is adapted for connection to a reservoir of material to be metered. An outlet or discharge opening 31 is provided through the plate 29 and also connects with the bore 21.

A rotatable valve member 32 is received within the bore 21 and the opposed ends of said valve member are provided with O-rings 33 and 34 for sealing engagement with the plates 22 and 29, respectively. It should be noted that the valve member 32 includes a shaft portion 35 which extends through the opening 24 in the retainer plate 22. The shaft 35 is in sealing engagement with the O-ring 25 and is received within a rotary solenoid motor member 36 mounted on the plate 22 by suitable means. The drive member of rotary solenoid motor member 36 is responsive to an applied force or signal from the photo cell 16 for effecting the rotational movement of the shaft 35 and the valve member 32 a predetermined angular distance. Such solenoid drive members are commercially available and well-known in the art. The rotatable valve member 32 is also provided with bores 37 which extend therethrough. The valve member 32 may be provided with any number of such openings, however for convenience, the valve member as shown herein, will only have two such bores. It will be appreciated from the description hereafter that the valve member 32 should have at least two bores 37 therethrough but that other openings could be utilized. When only two bores 37 are utilized in the valve member 32, it is necessary that the solenoid member 36 rotate the valve member 32 through an angle of 180°. However, as is obvious if more bores 37 are utilized in the valve member 32, it would be necessary to adjust or control the angle through which the solenoid member 36 would move the valve member.

It should be noted that the bores 37 are positioned in the valve member 32 for coaxial alignment with the inlet opening 30 and discharge opening 31 in the plate 29. Additionally, it should be noted that the opening 26 is coaxially aligned with the bores 37.

Floating pistons or discharge members 38 are slidably received within the bores 37 and contain O-rings or seals 39 and 40 thereabout for establishing a pressure fluid seal between the piston and the wall of the bores 37. In addition, the pistons are provided with a recessed area 41 in the upper end thereof which are coaxially aligned with the opening 26 in the retainer plate 22. It should be noted that the inlet and outlet openings 30 and 31 of the housing are smaller than the bores 37 and the valve members 38, such that the housing 20 forms abutment shoulders for preventing the pistons from being expelled from the valve member 32. Further, it should be noted that the pistons 38 in the bores 37 define a metering chamber 42 for receiving a predetermined volume of material to be metered or discharged.

Connected to the plate 22 is an actuator or air cylinder 43 which has push rod 44 extending therefrom and into the opening 26 in the retainer plate 22. The push rod 44 is sealably engaged by the O-ring 28. The air cylinder 43 is also connected to the photo cell 16 so that its activation or movement is effected by an applied force or signal transmitted from said photo cell.

In operation of the subject equipment in automatically forming tacos, the belt 11 is continually rotated by the driven member 8 and tortillas are supplied thereto from a source not shown. Equipment for automatically forming tortillas is well known in the art and these tortillas may be supplied with even spacing or randomly placed on the conveyor 11 without effecting the operation of the machine 1. The inlet 30 of the metering valve 15 is connected to a reservoir or source of taco meat filler (not shown) which is supplied under pressure. When the valve member 32 aligns a bore 37 with the inlet 30, the taco meat filler serves to move the discharge piston 38 to its displacement position at the upper end of the bore 37. It may be desirable to construct the pistons 38 from a light weight material so that the weight of the piston does not interfere with the supply of material to the chamber 42. Since such a meat filler is maintained at a temperature of 60° - 70° F. the material is extremely difficult to move and won't flow. However, satisfactory results have been obtained in uniformly metering a desired quantity of filler material from the food handling member 15. The meat filler thus fills the metering chamber 42 with the predetermined quantity of meat to be supplied to the tortilla. Further, since the opening 27 is provided in the retainer plate 22, the air above the piston 38 is exhausted so that no air pressure is built-up behind the piston to resist the flow of filler into the chamber 42. As a tortilla passes the photo cell 16, a signal or impulse is transmitted to the solenoid 36 which serves to rotate the valve member 32 and align the metering chamber 42 with the outlet 31. This also aligns the other chamber 42 with the inlet 30 for filling as previously described. After the valve 32 has aligned the chamber 42 with the outlet 31, the air cylinder 43 is activated in response to an applied force or signal from the photo cell 16 which serves to move the push rod 44 downward through the openings 26 and establish a driving engagement with the piston 38 in the recess 41. The downward movement of the push rod 44 serves to move the piston 38 from its displaced position to the discharge position abutting the housing 20 and forcing the meat contained in the metering chamber 42 therefrom. The taco meat or filler is then deposited on the tortilla as it passes therebelow. The tortilla is then conveyed by the belt 11 between the opposed rollers 17 which fold the tortilla about the meat filler and supply sufficient pressure to the tortilla to form an enclosed envelope about the meat filler. As is obvious additional metering chambers could be provided in the valve 32 so that less rotational movement would be needed for each indexing of the valve member to position a chamber in alignment with the inlet and outlet openings. The seal established between the valve member 32 and housing 20 would prevent the leakage of material from the metering chambers as they were moved between the inlet and outlet. It should be appreciated that the food handling or dispensing member 15 could be utilized for metering other materials equally well, such as mustard, catsup, etc. It should also be realized that the activation of the solenoid member 36 and air cylinder 43 may be effected in timed sequence rather than by demand sequence using the photo cell 16. Further, it should be noted that the quantity of material to be handled or dispensed by the member 15 may be easily adjusted by merely removing the plate 29 and inserting pistons 38 which will form the desired metering chamber 42 within the bores 37.

In view of the foregoing, it is now apparent that applicant has disclosed a unique food handling equipment and method of use thereof, particularly for automatically forming tacos and that other modifications and changes could be made from the apparatus and method disclosed without departing from the spirit of the invention.

I claim:

1. A machine for automatically and continuously forming a taco food product comprising: a frame having a continuously moving belt thereon, a reservoir on the frame for holding a supply of taco meat filler therein, metering means connected to said reservoir for supplying a predetermined amount of filler from said reservoir to a tortilla positioned on said belt, and signal means on said frame being responsive to the positioning of a tortilla on said belt at a preselected position to activate said metering means and supply the predetermined amount of meat filler to the tortilla, said metering means including a housing having a rotary valve therein, said rotary valve having at least two metering chambers therein, a floating piston in each of said metering chambers in fluid pressure engagement therewith and movable between a discharging position and a displacement position, said floating piston being moved from the discharging position to the displacement position as the meat filler is supplied to said metering chamber, drive means connected to said rotary valve member, said drive means being responsive to the signal means to move said rotary valve member and said metering chambers from a first position permitting the receiving of the meat filler from said reservoir to a second position permitting the discharge of the meat filler therefrom, and actuation means on said housing including a push rod engageable with said floating piston when in the discharge position, said actuation means and push rod being responsive to the signal means upon the positioning of the metering chamber at the second position to engage and move said floating piston in a direction to discharge the meat filler from said metering chamber onto the tortilla positioned on said belt and a pair of rollers on opposite sides of said belt predeterminately spaced apart, the belt being passed between said rollers for folding and pressing the tortilla after the meat filler has been supplied thereto.

2. The machine according to claim 1 wherein said drive means comprises a rotary solenoid motor which is responsive to said signal means for rotating said rotary valve member through an angle of 180°.

* * * * *

UNITED STATES PATENT OFFICE
CERTIFICATE OF CORRECTION

Patent No. 3,782,272                Dated January 1, 1974

Inventor(s) Ernest A. Cooper

It is certified that error appears in the above-identified patent and that said Letters Patent are hereby corrected as shown below:

In the introductory portion of the specification immediately following the inventor's name and title of the invention, the assignee, "Toolmakers, Inc." should be "Foodmaker, Inc.".

Column 2, line 61, "of" should be "or".

Signed and sealed this 17th day of September 1974.

(SEAL)
Attest:

McCOY M. GIBSON JR.
Attesting Officer

C. MARSHALL DANN
Commissioner of Patents